(12) United States Patent
Holzhueter et al.

(10) Patent No.: US 8,616,648 B2
(45) Date of Patent: Dec. 31, 2013

(54) VEHICLE SEAT AND RECLINER FITTING FOR VEHICLE SEAT

(75) Inventors: Walter Holzhueter, Southgate, MI (US); Todd Gilson, Livonia, MI (US); Dirk Brassat, Clarkston, MI (US)

(73) Assignee: Keiper GmbH & Co. KG, Kaiserslautern (DE)

( * ) Notice: Subject to any disclaimer, the term of this patent is extended or adjusted under 35 U.S.C. 154(b) by 306 days.

(21) Appl. No.: 13/045,883

(22) Filed: Mar. 11, 2011

(65) Prior Publication Data

US 2012/0228915 A1 Sep. 13, 2012

(51) Int. Cl.
*B60N 2/02* (2006.01)
*B60N 2/235* (2006.01)

(52) U.S. Cl.
USPC .................. 297/367 P; 297/366; 297/367 R

(58) Field of Classification Search
USPC .................. 297/366, 367 R, 368, 369, 367 P
See application file for complete search history.

(56) References Cited

U.S. PATENT DOCUMENTS

| 6,585,324 | B2 * | 7/2003 | Eppert et al. ............... 297/463.1 |
| 6,991,295 | B2 * | 1/2006 | Peters ........................ 297/367 R |
| 7,100,987 | B2 * | 9/2006 | Volker et al. .............. 297/367 R |
| 7,114,778 | B2 * | 10/2006 | Schuler et al. ............ 297/367 R |
| 7,198,330 | B2 | 4/2007 | Wahlen et al. |
| 2009/0096234 | A1 * | 4/2009 | Pauken et al. ................ 296/1.03 |
| 2009/0096269 | A1 * | 4/2009 | Kojima et al. ................ 297/362 |

* cited by examiner

*Primary Examiner* — Philip Gabler
(74) *Attorney, Agent, or Firm* — McGlew and Tuttle, P.C.

(57) ABSTRACT

A vehicle seat is provided, in particular motor vehicle seat, including a seat part (3) and a backrest (4) which are connected by recliner fittings (5) that are connected together by a shaft (7) connected to a hand lever (9) for unlocking each recliner fitting to adjust an angle of the backrest relative to the seat base. The fitting has a first fitting part (11) and a second fitting part (12) mounted to be rotatable relative to each other about an axis of rotation. The second fitting part has inwardly facing toothing which extends along at least a portion of an arc. A locking device with a driving element 27 is connected to the shaft and locking elements movable in response to rotation of the shaft.

20 Claims, 9 Drawing Sheets

VEHICLE SEAT AND RECLINER FITTING FOR VEHICLE SEAT

FIELD OF THE INVENTION

The invention relates to a vehicle seat, in particular a motor vehicle seat, having a seat part and a backrest which backrest is connected by recliner fittings to the seat part and may be pivoted relative thereto about an axis and more particularly the invention relates to an improved vehicle seat recliner fitting.

BACKGROUND OF THE INVENTION

Most automobile seats have two recliner fittings between the seat backrest and the seat cushion (seat part) in order to adjust the angle of the backrest. U.S. Pat. No. 6,991,295 B2 describes a recliner fitting which has been used for many years. This recliner fitting is based on two fitting parts and a locking device with locking elements moved by an eccentric element which is rotated by a hand lever connected to a shaft. The left and the right recliner are connected by a shaft, which is described in U.S. Pat. No. 7,198,330 B2 (D2). The passenger can actuate the hand lever fitted to one end of the shaft, so that the shaft rotates and both recliner fittings are unlocked.

Although the recliner fittings and associated locking devices are robust and capable of use for many years, the locking devices can be exposed to very high loads based on applying high loads to the hand lever. High loads can subject the eccentric and related drive element to unnecessary twist. This can lead to problems including a movement of the hand lever non-use position as well as a movement of the hand lever use position, based on twists and deformation of the connection between the shaft and the locking device.

SUMMARY OF THE INVENTION

It is an object of the invention to provide a recliner fitting that avoids damage to the locking structure of the fitting, if the passenger actuates the hand lever with a high load (misuse). It is a further object of the invention to provide a stop structure to avoid the application of high loads to the fitting end to preferably also establish a non-use position for the hand lever.

According to the invention, a recliner fitting for a vehicle seat is provided between a seat base and a backrest at each side thereof. Each side of the recliner fitting is connected by a shaft connected to a hand lever for unlocking each recliner fitting to adjust an angle of the backrest relative to the seat base, the fitting comprising. The recliner fitting includes a first fitting part connected to one of the seat base and the backrest and a second fitting part connected to the other of the seat base and the backrest. The first fitting part and the second fitting part are mounted to be rotatable relative to each other about an axis of rotation. The second fitting part includes inwardly facing toothing which extends along at least a portion of an arc. A locking device is provided with a driving element connected to the shaft and locking elements movable in response to rotation of the shaft. Each of the locking elements has a radial outward side with at least one tooth for engaging the toothing of the second fitting part when the locking element is in a locking position. One of the first fitting part and the second fitting part has an outer surface defining a recess having a recess surface with an end surface. A handle load element with a connected clip element is provided with the clip element connected to the driving element and the handle load element fixed to the shaft and extending radially outward from the shaft. The handle load element includes a cam arrangement for following the recess surface and for forming a stop with the end surface to limit movement of the cam arrangement and to prevent a transfer of high loads from the hand lever to the locking device.

The clip element may be a separate part from the handle load element. The clip element may include a clip structure engaging the driving element for retention of the clip element with the drive element in an axial direction up to a minimum retention force.

The clip element may include a handle side interface with a handle load element fixing structure including clip pins with the handle load element including openings receiving the clip pins to join the clip element with the handle load element. The clip element may instead include a handle side interface with a handle load element fixing structure including heat stakes. In this case the handle load element includes openings receiving the heat stakes, the heat stakes being heat treated to join the clip element with the handle load element.

The invention presents the advantage that an end stop structure is provided for a recliner fitting for vehicle seat to avoid or prevent damage from misuse forces being applied to the hand lever. If no misuse forces are applied to the hand lever, the construction of the fitting limits the angle of the hand lever and avoids an overtwist. However, the application of high forces on the handle can cause damage including an overtwist of the internal fitting structure. Although it is possible to have an end stop between the hand lever and the seat structure, this presents a customized solution and requires a different arrangement for every seat. In contrast the invention can be used independently of the seat design.

The invention also presents advantages related to construction and assembly. A single weld with three parts for a tube, shaft and the handle load element is particularly advantageous. The clip element comprising a two-way clip, for connection to the driving element and to the handle load element is simple to assemble sand eliminates the need for a pushnut.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
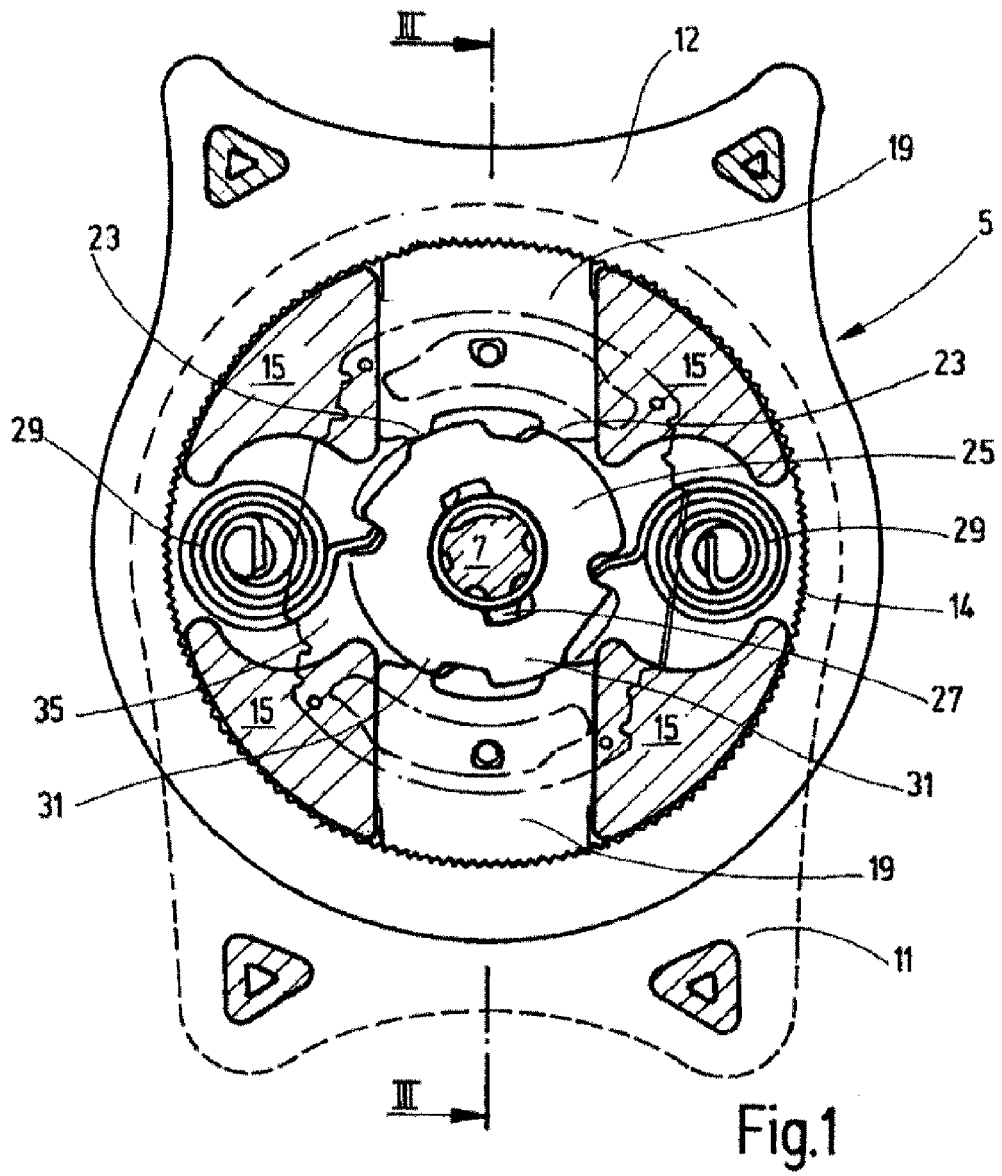
FIG. 1 is a sectional view taken along the line I-I in FIG. 3 showing a fitting according to the invention.
Figure 2:
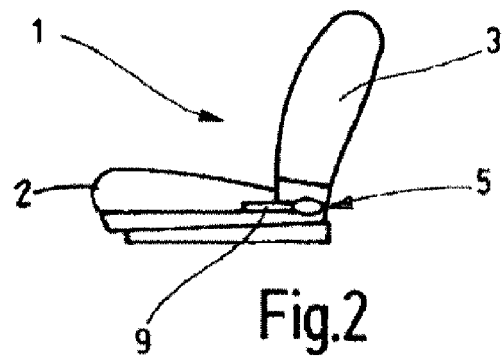
FIG. 2 is a schematic view of a vehicle seat equipped with fittings according to the invention.

Referring to the drawings in particular, a vehicle seat 1 of an automobile has a seat part 2 connected to a backrest 3 by fittings 5. The fittings 5 are at each of two sides of the vehicle seat 1 for the purpose of adjusting the inclination of the backrest 3 with respect to the seat part 2. The two fittings 5 are interconnected by a shaft or transmission bar 7. A hand lever 9, which is fixedly mounted to the transmission bar 7, serves to manually activate the fittings 5 concurrently. The indications of radial and axial direction given below with respect to fitting 5 and 60 relate to the cylinder coordinate system defined by the transmission bar 7.

Each fitting 5 comprises a first fitting part 11, and a second fitting part 12, which are held together in the axial direction by retaining plates (not shown). The first fitting part 11 is connected to the seat part 2, and the second fitting part 12 is connected to the backrest 3. The association of the fitting parts 11 and 12 may, however, also be interchanged, i.e. the first fitting part 11 may be fixed to the seat part 2 and the second fitting part 12 may be fixed to the backrest 3.

Figure 8:
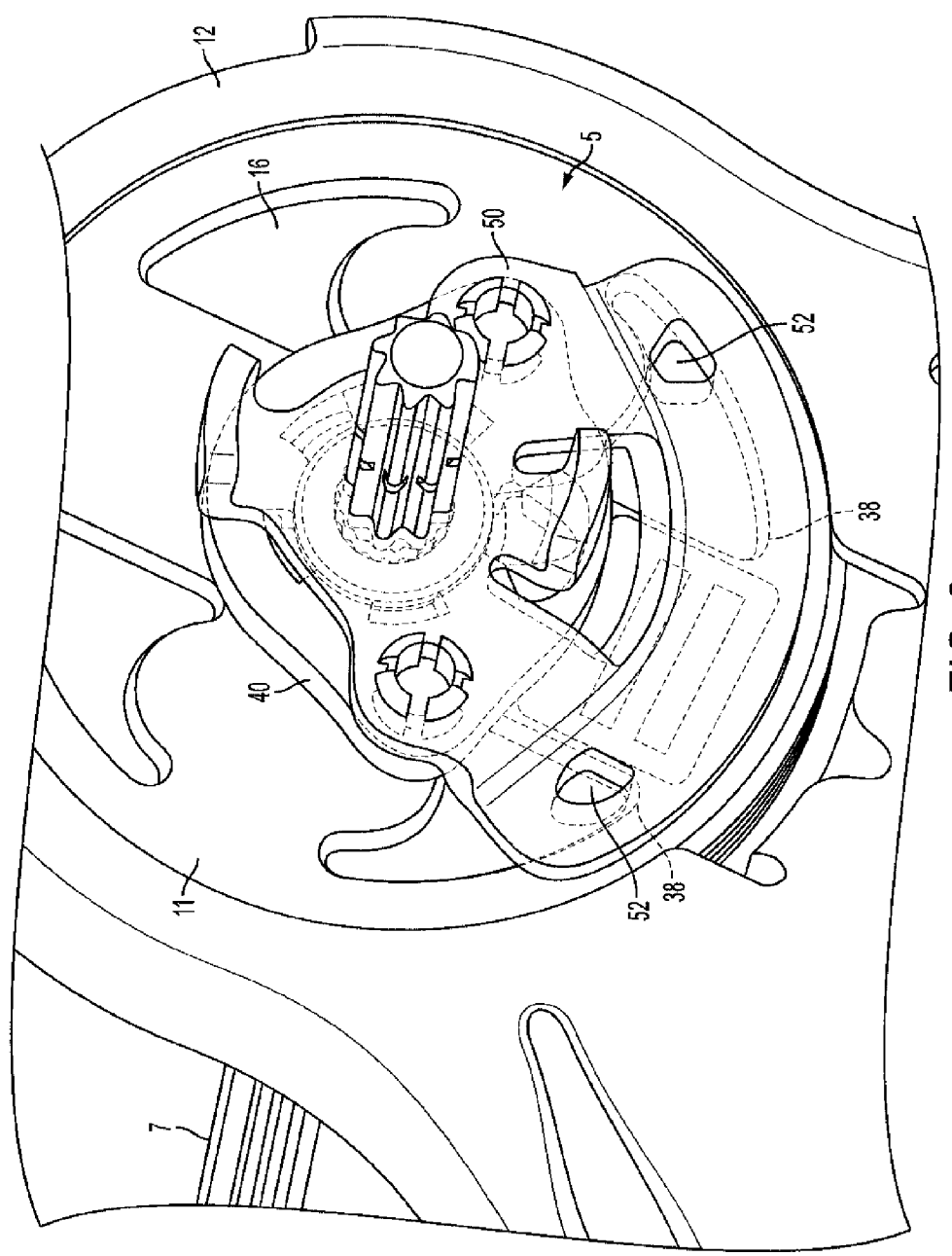
FIG. 8 is a perspective partially cutaway view of the fitting showing the interaction of the handle load limiter and clip load limiter with recesses of a first fitting part, shown in a non-use position.
Figure 9:
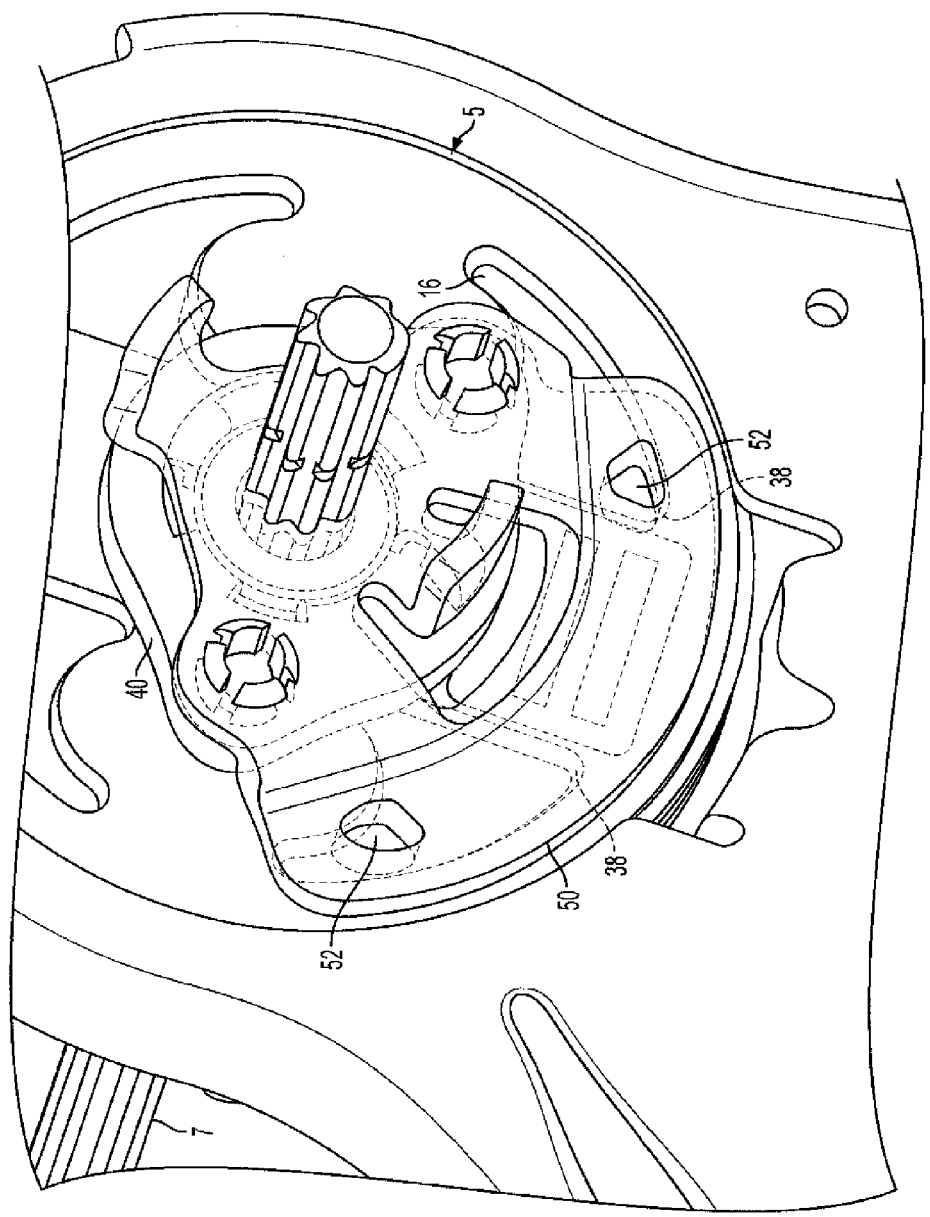
FIG. 9 is a perspective partially cutaway view of the fitting showing the interaction of the handle load limiter and clip load limiter with the recess of a first fitting part, shown in a use position.
Figure 17:
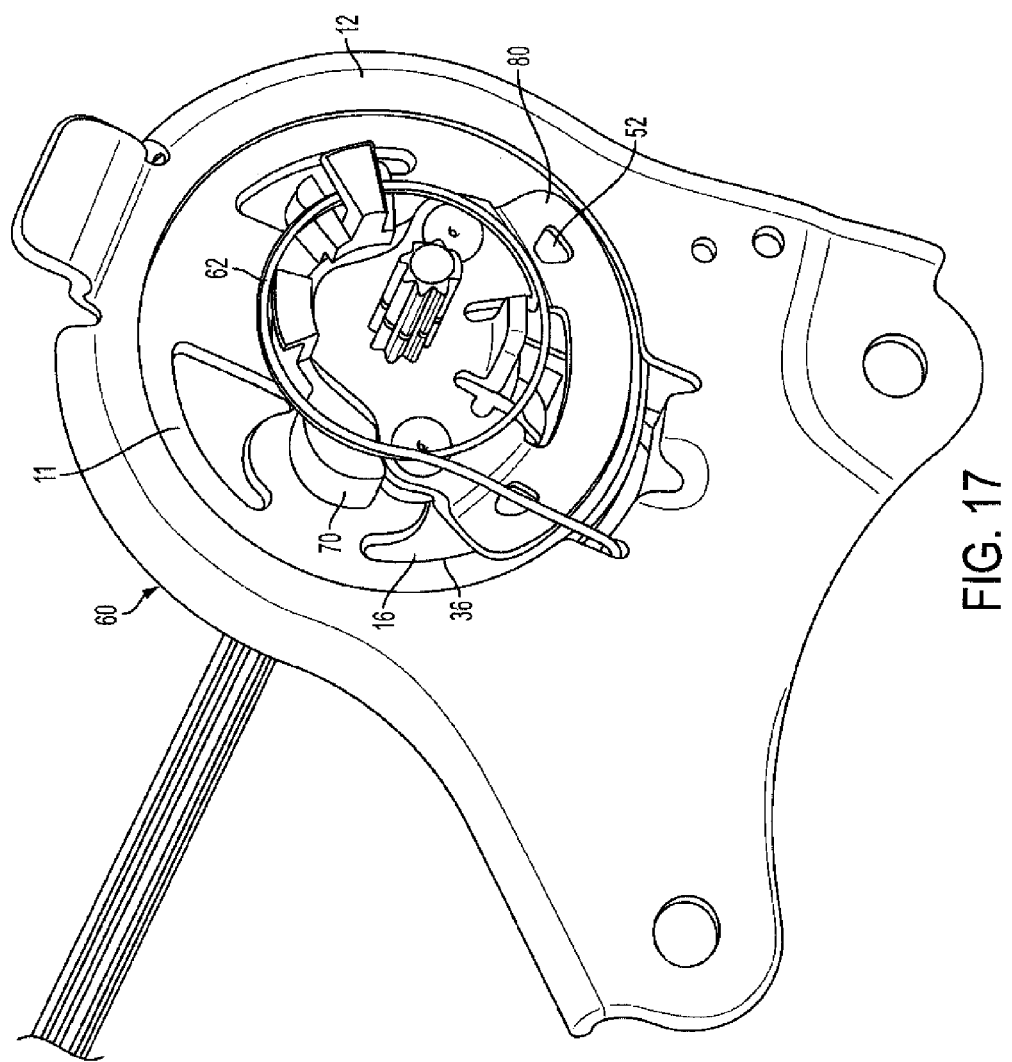
FIG. 17 is a perspective partially cutaway view showing a fitting with a handle return spring.

The first part 11 has a surface contour that provides, on an axial inner side, four guiding and bearing segments 15, which on the radially outward side form a cylindrical support surface with four sections, for a correspondingly curved, radially inward facing support surface on the second fitting part 12, which is embodied as a circle which is centered about the horizontal axis of rotation defined by the bar 7. This support surface of the second fitting part 12 further comprises a toothing 14. Each of two pairs of guiding and bearing segments 15 forms one guideway, extending radially and defined by parallel guide surfaces, for a movably attached toothed segment 19. The surface contour of the first part, on the axial outer side (handle side), provides recesses 16 having a recess surface 36 with an end surface 38 (FIGS. 8, 9 and 17).

Each toothed segment 19, also referred to herein as a locking element, comprises a plurality of teeth on a convexly curved side located radially further outward, which can cooperate with the toothing 14 of the second fitting part 12 in order to lock the fitting 5. The two corresponding guiding and bearing segments 15, guide the longitudinal sides 22, which extend in the direction of movement of the toothed segment 19. The radially inward side of toothed segment 19 comprises two convex locking cams 23 at a distance from one another. In order to push the two toothed segments 19 radially outward (in the locking direction), a disc shaped eccentric 25 is provided, which is mounted on the transmission bar 7 by means of a sleeve shaped driving element 27. Whereas the driving element 27 is fixedly mounted on the transmission bar 7, a backlash in the direction of rotation is provided between the eccentric 25 and the driving element 27, which compensates for torsions in the transmission bar 7, as well as for positional differences between the two fittings 5. Alternatively, a backlash may be provided between driving element 27 and transmission bar 7.

The eccentric 25 is pre-loaded by two spiral springs 29 in one direction of rotation, i.e. the closing direction. On the outer circumference of the eccentric 25, four radially outward projecting eccentric cams 31 are provided with one clamping face each, the latter being eccentrically curved in relation to the transmission bar 7. In the circumferential direction between the eccentric cams 31, the eccentric 25 is sufficiently offset in a radially inward direction to accommodate the locking cams 23.

A driving plate 35, which is fixedly mounted on the eccentric 25 and cooperates with the two toothed segments 19 via slot-and-bolt guideways, serves to retrieve the toothed segments 19 in a radial direction inward, i.e. the unlocking process, which is initiated by rotating the transmission bar 7 by means of the hand lever 9. The locking structure of the fittings 5 is described in detail in U.S. Pat. No. 6,991,295 B2 which is incorporated herein by reference in its entirety. The connection between the left and the right recliner fittings by the shaft as well as the spring that pretensions the shaft is described in U.S. Pat. No. 7,198,330 B2 (D2) which is incorporated herein by reference in its entirety. The passenger can actuate a hand lever 9 fitted to one end of the shaft 7, so that the shaft 7 rotates and both recliner fittings 5 are unlocked. The angle of the hand lever 9 is limited by a bump of the toothed segment notches to the border of the openings in the driving plate 35 (the driving plate 35 rotates with the hand lever 9, the toothed segments 19 do not). In the other direction (locked position) the wedged surfaces of the eccentric 25 which are in contact with the locking cams 23 avoid an overtwist. Although it may appear in FIG. 1 that the surfaces are equidistant to the middle axis, they are a little wedged in order to avoid free play. Although this construction limits the angle of the hand lever 9 and avoids an overtwist, if misuse forces are applied to the hand lever, the fitting may be damaged.

Figure 3:
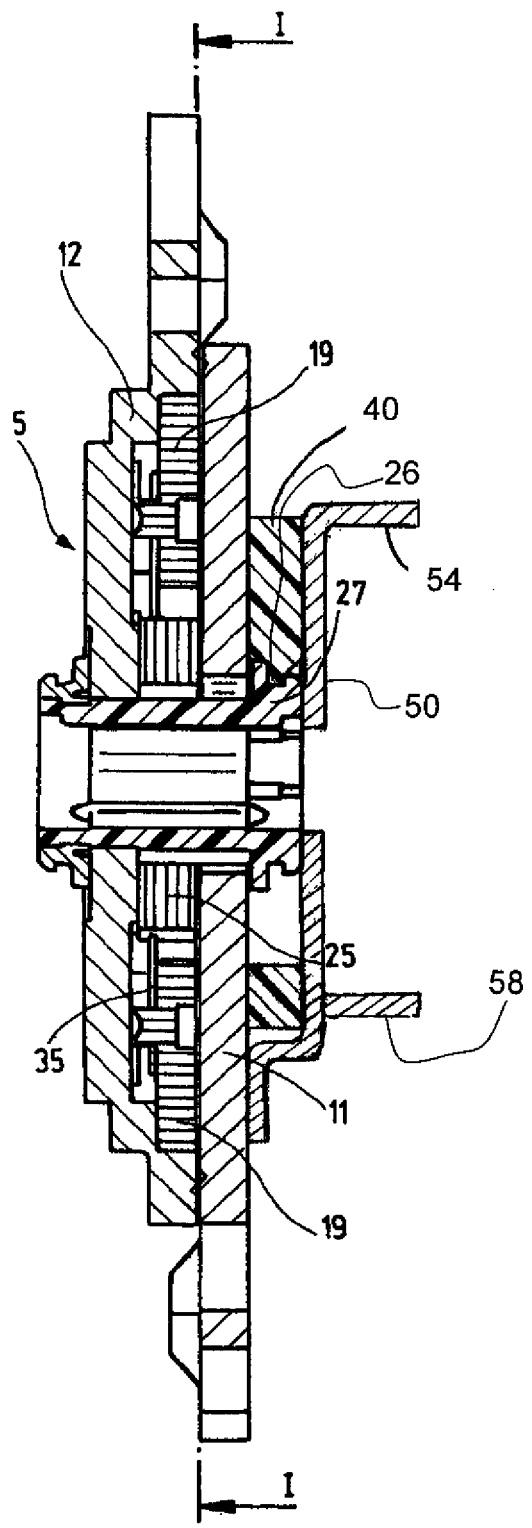
FIG. 3 is a sectional view taken along the line III-III in FIG. 1.

FIG. 3 shows the fitting 5 in a cross-sectional view. The fitting 5 has a clip load limiter 40 connected to the driving element 27 with a clip connection that axially fixes the clip load limiter 40 to the driving element 27 with possible circumferential relative movement. The clip load limiter 40 in turn is connected to a handle load limiter 50, which is fixed (welded) to the shaft 7.

Figure 4:
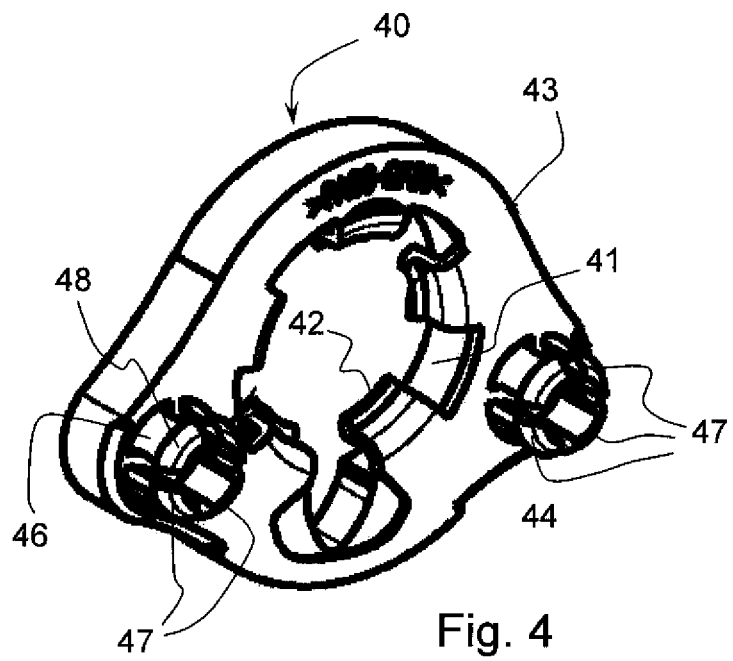
FIG. 4 is a top front perspective view of a clip load limiter according to the invention.
Figure 5:
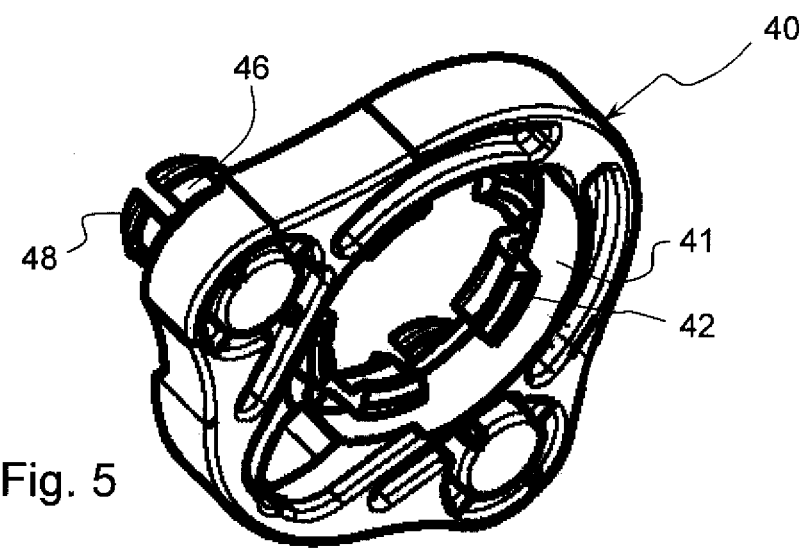
FIG. 5 is a top rear perspective view of the clip load limiter.

FIGS. 4 and 5 show an embodiment of the clip load limiter 40. The clip load limiter 40 has an annular base part 43 with a central opening 41. A plurality of clip parts 44 extend into a region of the opening 41. Each clip part 44 has a clip element 42. Each clip part 44 extends from the base part 43 in a radial inward direction and curves to extend in an axial direction to the clip element 42. Each clip part 44 has the ability to flex allowing the clip part 42 to engage an annular recess 26 formed in the driving element 27 with a latching action.

The clip load limiter 40 also has clip pins 46 which extend in an axial direction, away from the first fitting part 11. Each clip pin 46 is formed of a plurality of pin segments 47 (see FIGS. 4 and 5) which are connected to the base part 43 and extend to a clip part 48. Each of the pin segments 47 is flexible, allowing movement of the pin segments 47 so the clip pins 46 clip into openings 56 of the handle load limiter 50. The angle of each clip part 48 facilitates the radial movement of the pin segments 47 as the clip pin 46 moves into a respective opening 56 and beyond the surface of the handle load limiter 50. This clip connection can be seen in FIGS. 8 and 9.

Figure 6:
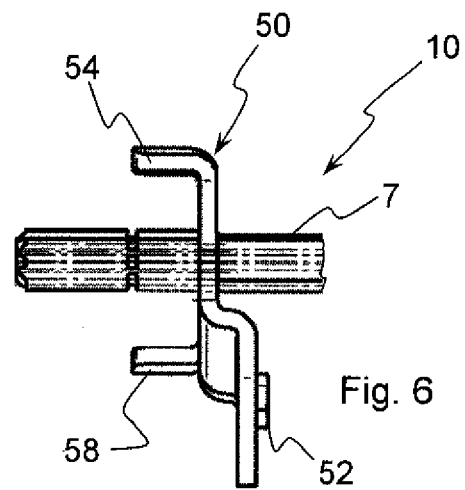
FIG. 6 is a side cutaway view of a shaft assembly according to the invention.
Figure 7:
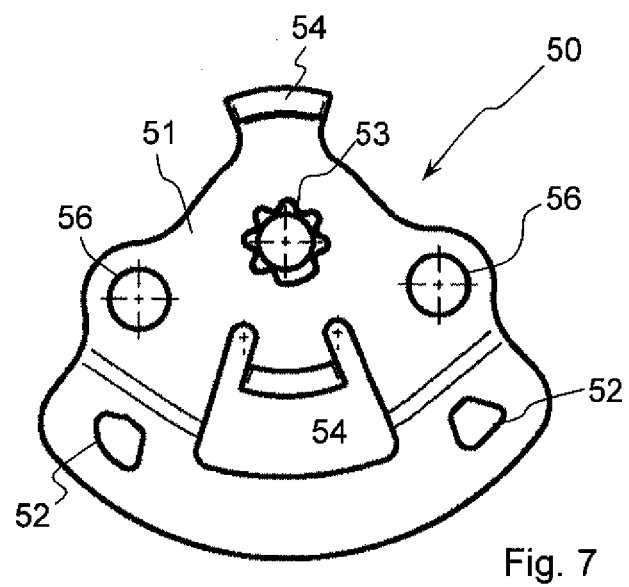
FIG. 7 is a front view of a handle load limiter.

FIG. 6 shows the handle load limiter 50 fixed to the shaft 7. The handle load limiter 50 has a planar part 51 with the openings 56 which receive the clip pins 46. Planar part 51 also includes an opening 53 which receives the transmission bar 7. Flanges 54 and 58 extend in a direction away from first fitting part 11, at right angles with respect to the planar part 51. Two cam parts 52 form a cam arrangement which interacts with fitting part recesses 16. Each recess 16 has a recess surface 36 with end surfaces 38. Based on the position of the cam parts 52, the cam arrangement extends into the recesses 16. The end surfaces 38 provide stop faces which limit the movement of the cam parts 52. Movement in the clockwise direction will result in at least one of cam element 52 abutting against an end surface 38 (the use position as shown in FIG. 9). Further, based on the action of the spring that pretensions the transmission bar 7, as described above, the shaft 7 will move in a counterclockwise direction, after cessation of force applied on the hand lever 9. Movement in the counterclockwise direction will result in at least one of cam elements 52 abutting against an end surface 38 (the non-use position as shown in FIG. 8). This non-use position defines the angle of the hand lever 9 in the non-use position.

Figure 10:
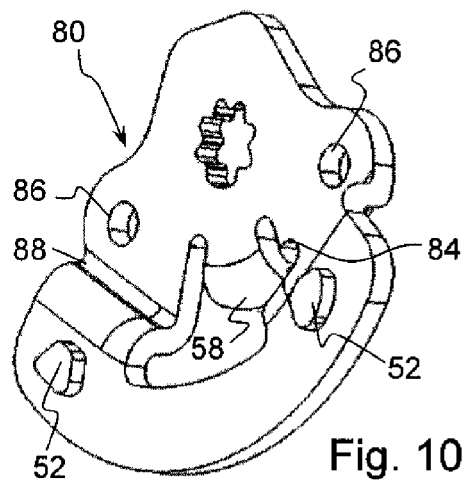
FIG. 10 is a perspective view of the handle load limiter according to a second embodiment of the invention.
Figure 11:
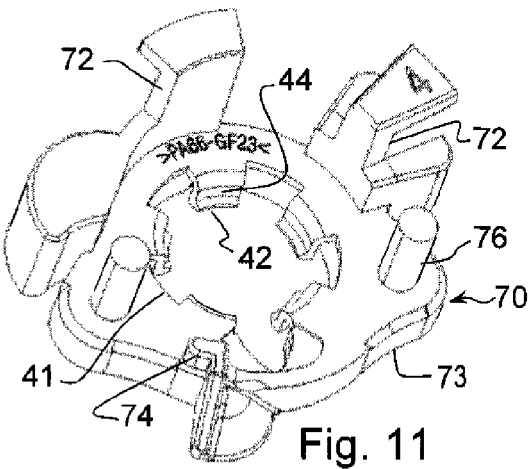
FIG. 11 is a perspective view of a clip load limiter according to the second embodiment of the invention.
Figure 12:
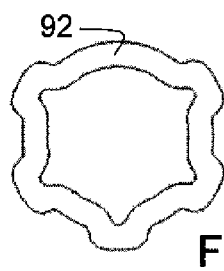
FIG. 12 is an end view of a tube forming part of a transmission bar according to the second embodiment the invention.
Figure 13:
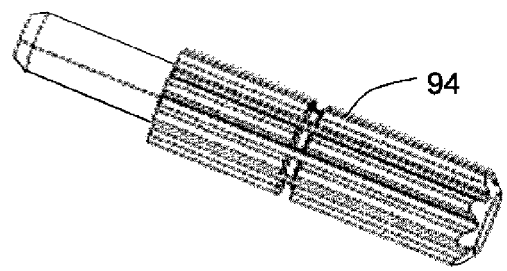
FIG. 13 is a handle interface shaft forming part of the transmission bar according to the second embodiment the invention.

The invention provides a fitting 5 with an end stop feature based on the clip load limiter 40 and the handle load limiter 50 fixed to the transmission bar 7. A shaft assembly 10 is provided with the handle load limiter 50 fixed (welded) to the transmission bar 7 as shown in FIG. 10. For mounting, the clip load limiter 40 is connected to the driving element 27 of the recliner fitting 5 by the clip elements 42. The shaft assembly 10 is inserted trough the driving element 27. The transmission bar 7 and the driving element 27 are toothed to provide a torque-proof connection. When the first end of the transmission bar 7 reaches the recliner fitting 5 on the other seat side, it is inserted in the respective driving element 27 and the transmission bar 7 is completely inserted. The two clip-pins 46 of the clip load limiter 40 clip into the two openings 56 of the handle load limiter 50 and are fixed to the shaft and fix the relative position of the shaft 7.

The cam arrangement, with the two cams 52 of the handle load limiter 50 that are fixed to the transmission bar 7, interacts with the recesses 16 of the recliner fitting 5. These recesses 16 are formed in the first fitting part 11, at the back side (handle side) of bearing segments 15. If the passenger actuates the hand lever 9, the first cam 52 hits the end surface wall 38 of one of the recesses 16, before the load is improperly high (FIG. 9). This avoids application of excessive loads to the recliner fitting. Without an end stop the inner mechanism of the recliner can be destroyed, e.g. the eccentric 25 may be subjected to an over-twist. If the hand lever is not actuated, the other of the two cams 52 hits another end surface wall 38 of another recess 16. This defines the angle of the non-used hand lever 9 (FIG. 8).

FIGS. 10 through 17 show features of the second embodiment of a fitting 60 according to the invention. The fitting 60 has a locking structure (locking device) which is essentially the same as fittings 5 with a first fitting part 11 with an interior surface forming bearing segments 15 and an outer surface with recesses 16. Each recess 16 has a recess surface 36 with end surfaces 38 which is as shown in FIGS. 8 and 9. The fitting 60 includes a clip load limiter 70 and a handle load limiter 80 with a modified design. The clip load limiter 70 is provided which is similar to the clip load limiter 40. The clip load limiter 70 further includes handle return spring guide surfaces 72 which support the path of the handle return guide spring 62 (FIG. 17). The clip load limiter 70 also includes an alignment projection 74 for engaging, in alignment, receiving slot 84 of the handle load limiter 80. The clip load limiter 70 includes heat stakes 76 which are deformed by heating to fix the stakes 76 of the clip load limiter 70 in the openings 86 on the handle load limiter 80.

Figure 14:
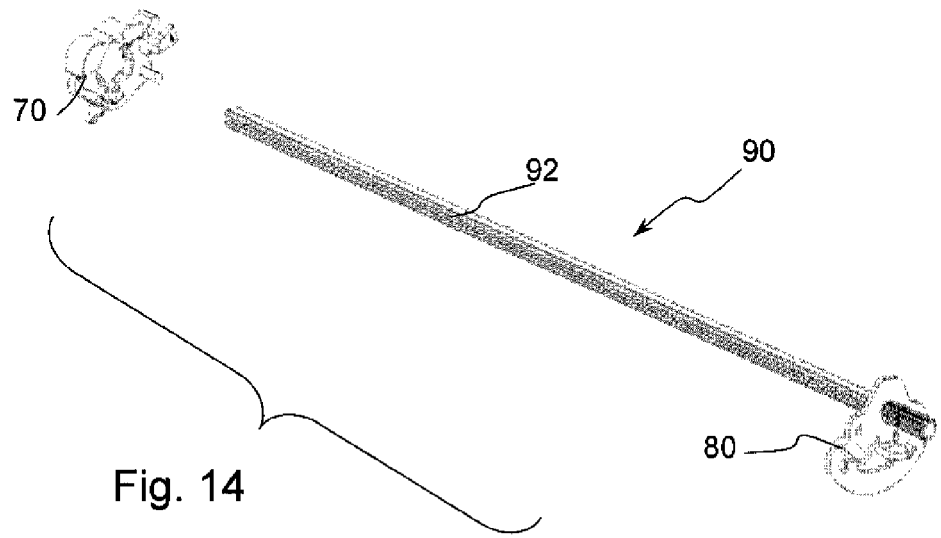
FIG. 14 is a perspective view showing a shaft assembly and position for connection of the clip load limiter according to the second embodiment of the invention.
Figure 16:
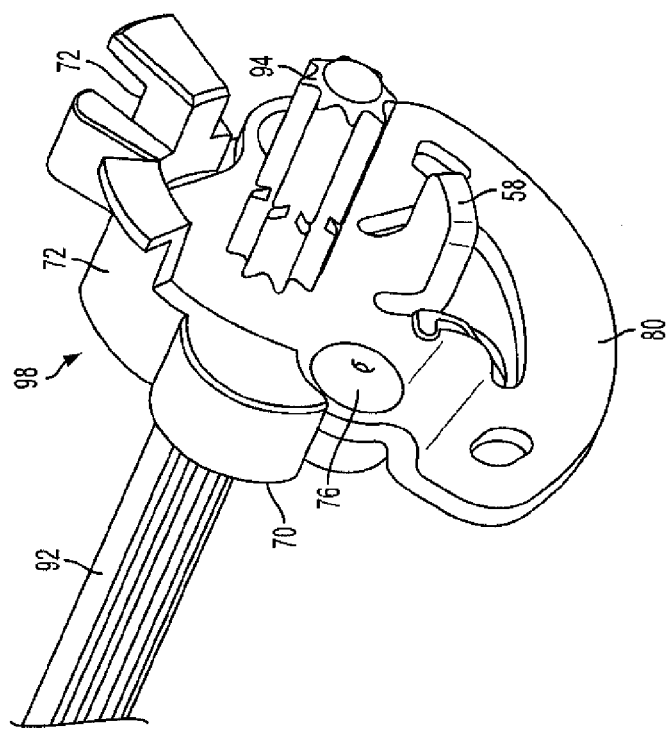
FIG. 16 is a perspective view showing the connection of the clip load limiter and shaft assembly with handle load limiter.
Figure 15:
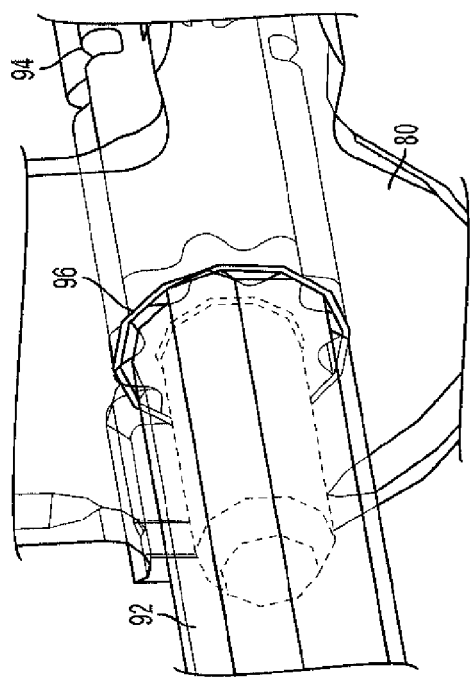
FIG. 15 is a perspective view showing the interior of the weld connection between the tube, the handle load limiter, and the handle interface shaft.

FIG. 14 shows a shaft sub assembly 90 with the clip load limiter 70 positioned for connection according to the second embodiment. The shaft sub assembly 90 is made up of a tube 92 which is welded to handle interface shaft 94 and handle load limiter 80. The weld 96 is a tube to plate spline weld 96 as shown in FIG. 15. FIG. 14 also shows the position of the clip load limiter 70 as it is moved onto the shaft 92 and then positioned for heat staking the clip load limiter 70 to the handle load limiter 80 to form the final shaft assembly 98 as shown in FIG. 16.

The clip load limiter 70 has a central opening 41 with clip elements 42 extending from an annular base part 73 to clip parts 44. The clip parts 44 are received in the annular recess 26 formed in the driving element 27 with a latching action.

FIG. 17 shows the fitting 60 in an assembled state, along with the handle return guide spring 62. The guide spring 62 is connected to the second fitting part 12 and is coursed around the handle interface shaft 94 with the guide spring 62 supported and guided via guide surfaces 72. The guide spring 62 extends around the handle interface shaft 94 by about 1¾ turns and engages around handle load limiter 80 and reverses direction to be seated in a spring connection interface in the form of a groove 88 (see FIG. 10). As described above, the spring 62 acts to move the handle to a non-use position, namely it returns the handle to a non-use position after use.

The stop action provided by the two cams 52 of the handle load limiter 80 interacting with the end surfaces 38 interacting with the recess 16 is the same as described above with reference to FIGS. 8 and 9. The stop action provided in the use position prevents an over twisting of the eccentric 25. This avoids a transmission of high loads to the locking structure. Further, the stop action provided in the non-use position defines the angle of the hand lever 9 in the non-use position.

While specific embodiments of the invention have been described in detail to illustrate the application of the principles of the invention, it will be understood that the invention may be embodied otherwise without departing from such principles.

APPENDIX

List of Reference Numerals

1 Vehicle seat base
2 Seat part
3 Backrest
5 fittings
7 Transmission bar
9 Hand lever
10 shaft assembly
11 First fitting part
12 Second fitting part
14 toothing
15 bearing segments
16 first fitting part recesses 19 toothed segment
23 locking cams
25 eccentric
26 annular recess
27 driving element
29 springs
31 eccentric cams
35 driving plate
36 recess surface
38 recess end surface
40 clip load limiter
41 opening
42 clip element
43 annular base part
44 clip part
46 clip pins
47 pin segments
48 clip part
50 handle load limiter
51 planar part
52 cam parts
53 opening
54 flange
56 openings
58 flange
60 fitting
62 handle return guide spring
70 clip load limiter
72 guide surfaces
73 annular base part
74 alignment projection
76 stake
80 handle load limiter
84 receiving slot
86 openings
88 a spring connection interface—groove
90 shaft sub assembly
92 tube
94 handle interface shaft
96 spline weld
98 final shaft assembly

What is claimed is:

1. A recliner fitting for a vehicle seat, the recliner fitting being between a seat base and a backrest at each side thereof with each side of the recliner fitting being connected by a shaft connected to a hand lever for unlocking each recliner fitting to adjust an angle of the backrest relative to the seat base, the fitting comprising:
a first fitting part connected to one of the seat base and the backrest;
a second fitting part connected to the other of the seat base and the backrest, the first fitting part and the second fitting part being mounted to be rotatable relative to each other about an axis of rotation, the second fitting part including inwardly facing toothing which extends along at least a portion of an arc;
a locking device with a driving element connected to the shaft and locking elements movable in response to rotation of the shaft, each of the locking elements having a radial outward side with at least one tooth for engaging the toothing of the second fitting part when the locking element is in a locking position, one of the first fitting part and the second fitting part having an outer surface defining a recess having a recess surface with an end surface; and
a handle load element with a connected clip element, the clip element being connected to the driving element, the handle load element being fixed to the shaft and extending radially outward from the shaft and said handle load element including a handle load element side surface defining a cam arrangement for following the recess surface and forming a stop with the end surface to limit movement of the cam arrangement and to prevent a transfer of high loads from the hand lever to the locking device.

2. A recliner fitting according to claim 1, wherein:
the recess surface with the end surface has another end surface; and
the cam arrangement is limited in movement by the another end surface to define an angular position of non-use of the hand lever.

3. A recliner fitting according to claim 2, wherein:
the outer surface defining a recess has another recess with a first end and a second end forming the another end surface; and
the cam arrangement includes a first cam element following the recess and a second cam element following the another recess, said handle load element side surface defining said first cam element and said second cam element.

4. A recliner fitting according to claim 3, wherein the outer surface defining the recess corresponds to a surface with protruding portions corresponding to the recesses, the protruding portions each forming a bearing segment, with bearing segments cooperating to form guides for the locking elements.

5. A recliner fitting according to claim 1, wherein the clip element is part of a clip load limiter that is a separate part from the handle load element and the clip element engages the driving element for retention of the clip load limiter with the drive element in an axial direction up to a minimum retention force, said driving element comprising an outer driving element surface, said outer driving element surface defining an annular recess, at least a portion of said clip load limiter being arranged in said annular recess, wherein said clip load limiter engages said outer driving element surface.

6. A recliner fitting according to claim 5, wherein:
the clip load limiter includes a handle side interface with a handle load element fixing structure including clip pins, said clip pins extending in an axial direction with respect to a longitudinal axis of said clip load limiter; and
the handle load element including openings receiving the clip pins to join the clip element with the handle load element, said handle load element side surface defining at least a portion of said openings.

7. A recliner fitting according to claim 5, wherein:
the clip load limiter includes a handle side interface with a handle load element fixing structure including heat stakes, said heat stakes extending in an axial direction with respect to a longitudinal axis of said clip load limiter; and
the handle load element including openings receiving the heat stakes, the heat stakes being heat treated to join the clip element with the handle load element, said handle load element side surface defining at least a portion of said openings.

8. A recliner fitting according to claim 5, further comprising:
a handle return guide spring connected to one of the first and second fitting parts and connected to the handle load element to act on the handle load element and bias the handle load element toward a non-use position and to return the handle to the non-use position after use.

9. A recliner fitting according to claim 8, wherein the clip load limiter includes a guide surface for guiding the spring in a spring course between the spring connection to the one of the first and second fitting parts and the spring connection with the handle load element.

10. A recliner fitting according to claim 8, wherein the handle load element includes a spring connection interface for fixing an end of the spring to the handle load element.

11. A vehicle seat comprising:
a seat part;
a backrest; and
a fitting comprising:
  a first fitting part connected to one of the seat base and the backrest;
  a second fitting part connected to the other of the seat base and the backrest, the first fitting part and the second fitting part being mounted to be rotatable relative to each other about an axis of rotation, the second fitting part including inwardly facing toothing which extends along at least a portion of an arc;
  a locking device with a driving element connected to the shaft and locking elements movable in response to rotation of the shaft, each of the locking elements having a radial outward side with at least one tooth for engaging the toothing of the second fitting part when the locking element is in a locking position, one of the first fitting part and the second fitting part having an outer surface defining a recess having a recess surface with an end surface; and
  a handle load element with a connected clip element, the clip element being connected to the driving element, the handle load element being fixed to the shaft and extending radially outward from the shaft and including a cam arrangement for following the recess surface and forming a stop with the end surface to limit movement of the cam arrangement and to prevent a transfer of high loads from the hand lever to the locking device, said handle load element comprising a handle load element side surface facing said one of said first fitting part and said second fitting part, said cam arrangement extending from handle load element side surface in a direction of said clip element.

12. A vehicle seat according to claim 11, wherein:
the recess surface with the end surface has another end surface; and
the cam arrangement is limited in movement by the another end surface to define an angular position of non-use of the hand lever.

13. A vehicle seat according to claim 12, wherein:
the outer surface defining a recess has another recess with a first end and a second end forming the another end surface; and
the cam arrangement includes a first cam element following the recess and a second cam element following the another recess, said handle load element side surface defining at least a portion of said cam element and said second cam element.

14. A vehicle seat according to claim 13, wherein the outer surface defining the recess corresponds to a surface with protruding portions corresponding to the recesses, the protruding portions each forming a bearing segment, with bearing segments cooperating to form guides for the locking elements.

15. A vehicle seat according to claim 11, wherein the clip element is part of a clip load limiter that is a separate part from the handle load element and the clip element engages the driving element for retention of the clip load limiter with the drive element in an axial direction up to a minimum retention force, said driving element comprising an annular recess at an end portion thereof, at least a portion of said clip load limiter being arranged in said annular recess.

16. A recliner fitting according to claim 15, wherein:
the clip load limiter includes a handle side interface with a handle load element fixing structure including clip pins, said clip load limiter comprising a clip load limiter surface, said clip load limiter surface facing in a direction of said handle load element, said clip pins extending from said clip load limiter surface in an axial direction with respect to a longitudinal axis of said clip load limiter; and
the handle load element including openings receiving the clip pins to join the clip element with the handle load element, said handle load element side surface defining at least a portion of said openings.

17. A recliner fitting according to claim 15, wherein:
the clip load limiter includes a handle side interface with a handle load element fixing structure including heat stakes, said heat stakes extending from one side of said clip load limiter in an axial direction with respect to a longitudinal axis of said clip load limiter; and
the handle load element including openings receiving the heat stakes, the heat stakes being heat treated to join the clip element with the handle load element, said handle load element side surface defining at least a portion of said openings.

18. A vehicle seat according to claim 15, further comprising:
a handle return guide spring connected to one of the first and second fitting parts and connected to the handle load element to act on the handle load element and bias the handle load element toward a non-use position and to return the handle to the non-use position after use.

19. A vehicle seat according to claim 18, wherein the clip load limiter includes a guide surface for guiding the spring in a spring course between the spring connection to the one of the first and second fitting parts and the spring connection with the handle load element.

20. A vehicle seat according to claim 18, wherein the handle load element includes a spring connection interface for fixing an end of the spring to the handle load element.

* * * * *